United States Patent
Fa

(10) Patent No.: US 6,350,843 B1
(45) Date of Patent: Feb. 26, 2002

(54) EPOXY RESIN LOW ELECTRONIC IMPEDANCE HIGH MOLECULAR POLYMER

(76) Inventor: Hsu San Fa, No. 96-60, Na Gang Village, Ta Yuan Town, Tao Yuan Hsien (TW)

( * ) Notice: Subject to any disclaimer, the term of this patent is extended or adjusted under 35 U.S.C. 154(b) by 0 days.

(21) Appl. No.: 09/323,955

(22) Filed: Jun. 2, 1999

(51) Int. Cl.⁷ ................ C08G 59/04; C08G 59/54; C08K 3/22; G21K 1/10
(52) U.S. Cl. ................ 528/110; 428/930; 523/137; 523/420; 524/912; 525/529; 525/912; 528/123
(58) Field of Search .............. 525/529, 912; 523/420, 137; 528/110, 123; 524/912; 428/299.4, 930

(56) References Cited

U.S. PATENT DOCUMENTS

| | | | | |
|---|---|---|---|---|
| 3,073,786 A | * | 1/1963 | Kraft et al. | 525/529 |
| 3,183,198 A | * | 5/1965 | Wagner | 528/123 X |
| 3,442,849 A | * | 5/1969 | Tashlick et al. | 528/123 X |
| 3,878,132 A | * | 4/1975 | Bertram et al. | 528/110 X |
| 3,963,798 A | * | 6/1976 | Miller | 525/529 X |
| 4,004,054 A | * | 1/1977 | Audykowski et al. | 524/912 X |
| 5,025,067 A | * | 6/1991 | Yamamoto et al. | 528/123 X |
| 5,108,981 A | * | 4/1992 | Safari et al. | 428/930 X |
| 5,177,056 A | * | 1/1993 | Hilti et al. | 428/930 X |
| 5,204,025 A | * | 4/1993 | Yamada et al. | 523/137 X |
| 5,242,708 A | * | 9/1993 | Fekete et al. | 525/529 X |
| 5,331,026 A | * | 7/1994 | Benefiel et al. | 523/420 X |
| 5,358,982 A | * | 10/1994 | Geisler et al. | 523/420 X |
| 5,698,631 A | * | 12/1997 | Sigworth et al. | 528/110 X |
| 5,922,817 A | * | 7/1999 | Pedersen et al. | 525/529 X |

FOREIGN PATENT DOCUMENTS

| | | | | |
|---|---|---|---|---|
| EP | 0 505 000 | * | 9/1992 | 528/110 |

* cited by examiner

Primary Examiner—Richard D. Lovering
(74) Attorney, Agent, or Firm—Browdy and Neimark

(57) ABSTRACT

Conductive thermosetting epoxy resins are produced by mixing a metallic salt or oxide with an inorganic acid to form a metallic ion solution. An alcohol is added to effect a secondary dehydration and form a complex ion polymer with double bonds and p electrons. The mixture is neutralized to produce a high molecular weight polymer of low electronic impedance. This polymer is then copolymerized with an epoxy resin.

10 Claims, No Drawings

EPOXY RESIN LOW ELECTRONIC IMPEDANCE HIGH MOLECULAR POLYMER

BACKGROUND OF THE INVENTION

FIELD OF THE INVENTION

The present invention relates to an epoxy resin low electronic impedance high molecular weight polymer.

In the existing high molecular weight polymer series, there is yet no high molecular weight polymer which can be co-polymerized and cross linked with a resin monomer and hardened to form an electrically conductive polymer. Especially, when applied to epoxy resin floor coatings, the epoxy resin itself is an insulating material having excellent insulation, voltage-resistance, electric induction, etc. Generally, the volume resistance coefficient thereof is between $10^{12}$–$10^{17}$ ($\Omega \cdot$cm). In order to achieve a staticproof or even anti-explosion property, the volume resistance coefficient of the epoxy resin must be lowered to <$10^8$ ($\Omega \cdot$cm). With respect to the existing technique level, generally, conductive metal particles, carbon black powder, interface activating agent ion crystallized particles, electroplating metal short fibers, etc. are added to the epoxy resin main agent to serve as another kind of filling agent of the epoxy resin. Such filling agent itself fails to participate in the cross linking reaction between the epoxy resin high molecular weight polymers. The current is conducted by means of the contact between the molecular particles of the conductive filling agent. The conductive filling agent does not react with the epoxy resin to crosslink the epoxy resin so that the formed epoxy resin conductive floor layer has numerous defects. For example, the basic physical properties of the epoxy resin are ruined, mechanical strength is deteriorated, working technique is limited, etc. Most seriously, the resin itself not only is not conductive, but also will block the continuity of the current of the conductive filling agent. Therefore, the conductivity is unstable and the conductive floor will gradually lose its conductivity after being worn.

In this high technology time, the electronic and chemical industries have become more and more developed and advanced. Various automatic production equipment is used at high efficiency and speed. This leads to the problem of static. Especially, in the field of the semiconductor industry, the static will result in damage to the electronic circuit of the semiconductor and attachment of great amount of microdusts. As a result, a dustless room will be seriously contaminated. In the case that an excessively great amount of static is stored, a static discharging spark may take place. When encountering a combustible or explosive gas, a tragedy of gas explosion may take place. Therefore, the conductive epoxy resin floor plays an important role in the field of industrial factory floor.

With the above background, according to the present invention, the high molecular weight polymer as a non-filling agent directly participates in the cross linking reaction between the epoxy resin polymeric molecules and is copolymerized therewith and hardened to form a two-liquid type cross linking reaction thermosetting engineering plastic. Such plastic has excellent conductivity and is able to fully keep the common physical, chemical and mechanical properties, acid/alkali-resistance, weather-resistance, polish, and long using life of the original epoxy resin. In other words, the plastic is a high molecular epoxy resin polymer with low electronic impedance. More importantly, when applied to pavement to provide a conductive floor coating, not like the conductive filling agent product series which is greatly limited in working technique and method, the high molecular weight epoxy resin polymer c a n be applied according to the conventional working method of the epoxy, resin to achieve the desired objects. Doubtless, the epoxy resin conductive floor coating series of the present invention can be used instead of the existing epoxy resin conductive floor coating series made of conductive filling material. Thus, the serial products of the present invention can be entirely commercialized, popularized and specified.

As mentioned above, the up-to-date technical level of conductive and anti-static high molecular weight polymers is limited to adding a conductive filling agent and there is yet no conductive or anti-static high molecular weight polymer directly participating in the reaction. With respect to the currently collected references, for example, Taiwanese Patent No. 105227 entitled "conductive resin compound", a resin compound is disclosed, which contains (1) 25–99.5 weight % of isomerized polymer and (2) 0.5–75 weight % of conductive mineral black. It is mentioned in this reference that the resin can be co-used with other "conductive filling materials". The so-called "conductive filling materials" means metal micro-particle series such as graphite powder, silver powder, copper powder, nickel powder, stainless steel powder, tin dioxide powder, copper/silver mixture powder, nickel/silver mixture powder, silver-painted glass ball, copper gas ball, etc., metal fragment series such as aluminum fragment, bronze fragment, nickel/iron alloy fragment, etc., and metal short fibers including carbon fiber, aluminum fiber, bronze fiber, aluminum strip, cold-plated fiber glass, carbon-painted fiber glass, etc. It can be known from the above description that "conductive filling materials" in fact do not go through a polymerization reaction with the high molecular polymer. Furthermore, it is clearly shown from the comparison table disclosed in the reference that when A/B/C/D four kinds of resins are free from any conductive filling material, the measured volume resistance coefficients are all above $10^{16}$ $\Omega \cdot$cm. Therefore, it can be proved that the resin itself is a high molecular weight polymer which is totally not conductive.

In addition, in Japanese Patent Publication. No. 平2-2904 entitled "conductive floor", a conductive floor painting material is disclosed, which is composed of colored compound resins which are hardened at normal temperature. The compound resins such as epoxy resin, unsaturated polyester resin, etc. are mixed with conductive filling materials such as zinc white powder, aluminum micro-particle, etc. The mixture is co-used with fiber-like reinforcing materials such as carbon fiber, stainless steel fiber, fiber glass, etc. and anti-abrasion metal bone material (stainless steel microparticles). No conductive polymerization or reaction related to the resin is seen from the description of the reference. This reference merely describes what kind of conductive filling material is added and how the filling material is added to achieve better conductive function. Therefore, it is still concluded that the high molecular weight resin itself is not conductive and substantially insulating.

The interesting thing is that the description mentions that the conductive floor material has a viscosity within a range from 4000 to 13000 cps and thus has a good fluidity. Therefore, a so-called "plane flowing floor surface working method" can be achieved as a break through of the working method. However, this can only achieve a plane surface and versatile colors for selection. The problems of "mirror face polish" and "film thickness" of working are not mentioned. This further proves the fact that the high molecular resin basically is not conductive.

Furthermore, in Taiwanese Patent Publication No. 343987 entitled "anti-static resin", an anti-static resin compound is disclosed, which is composed of 5–50% hydrophilic copolymer and 50–95% thermoplastic resin. In fact, the hydrophilic copolymer is polymerized by means of self-emulsification polymerization method and pertains to one kind of anti-static interface activating agent. Such anti-static agent is better than a general one. However, basically, it is also a kind of conductive filling material. When blended with ABS resin, it is clearly shown from the table that the lowest resistance coefficient among all the embodiments is only $7 \times 10^9$. The others are all above $10^{10}$. The electronic impedance of the surface of the formed product is still considerably high. Therefore, such material can be hardly qualified as a conductive additive of the thermosetting resin floor painting. In other words, a practical purpose cannot be achieved by means of adding such conductive filling agent to the conductive floor painting.

Japanese Patent Nos. 165559 and 36297 disclose an application of a kind of metal electroplating short fiber as a conductive filling material. These Patents focus on a painting method for epoxy resin conductive floor. The materials used include 1. carbon fiber mesh (a conductive fiber matting formed by carbon fiber); 2. electroplating alloy short fiber; 3. various kinds of metal scales (mainly copper, aluminum and stainless steel); and 4. various kinds of epoxy resin liquids. However, the resin itself is not conductive so that a great amount of conductive filling material must be added thereto to achieve a satisfactory conductivity. Basically, once the conductive carbon fiber matting is mixed into the non-conductive laminated resin, the conductive function will be immediately deteriorated and it is necessary to further add metal short fiber thereto for enhancing the conductivity. Accordingly, the material cost is increased and the working time is greatly prolonged. Moreover, the greatly added conductive filling materials will make the surface of the floor dim. In addition, the micro-particles of the filling materials will be oxidized and detached to become powder dust. This not only leads to pollution, but also tends to cause unidentified sparks due to abrasion. Therefore, such paint is full of potential danger and not idealistic.

In order to obviate the above problems, according to the present invention, a high molecular weight polymer with low electronic impedance is co-polymerized with an epoxy resin to form a resin liquid which itself has good and stable conductivity. Therefore, the inconvenience and waste caused by greatly adding the conductive filling materials are avoided. The resin liquid can be used as a general epoxy resin floor coating or paint. With respect to the fiber laminate, the laminated epoxy resin liquid co-polymerized with the low electronic impedance high molecular weight polymer of the present invention itself has the conductive function. Therefore, the non-conductive fiber glass matting (GRF) is immediately changed into a "complex conductive FRP laminate material" with excellent conductivity. This is another characteristic of the present invention.

SUMMARY OF THE INVENTION

It is a primary object of the present invention to provide an epoxy resin high molecular weight polymer with low electronic impedance. This can be described in view of two respects. First is related to the description of the intermediate body of the low electronic impedance high molecular weight polymer. The second is related to the description of the participation of the intermediate body in the co-polymerization of the epoxy resin to form the conductive low electronic impedance high molecular weight epoxy resin polymer. With respect to the preparation of the intermediate body of the low electronic impedance high molecular weight polymer, a metallic salt is mixed with a certain amount of inorganic acid and fully stirred to dissolve and form a metallic ion solution. Then an alcohol is added into the solution to go through a secondary dehydration and form a complex ion polymer with double bonds and n electrons. Such polymer is in an acidic environment so that it will continuously react and polymerize. Therefore, it is necessary to first neutralize the acidic environment of polymer to maintain the pH within a range of 6~8 so as to terminate the reaction. This is the preparation procedure of the intermediate body of the low electronic impedance high molecular weight polymer. In general, the best way to neutralize the acidic environment is to add a certain amount of amine so as to reach a neutralized pH and terminate the reaction of the polymer and change the polymer into a stable and usable material.

With respect to the co-polymerization between the intermediate body of the low electronic impedance high molecular weight polymer and the epoxy resin for forming the low electronic impedance epoxy resin polymer, it is applicable to those thermosetting engineering plastic products, painting films or laminated complex materials related to epoxy resin, such as civil engineering series: antistatic epoxy resin floor and conductive anti-static spark and anti-explosion floor; wall-used painting series: operating room anti-static floor, ceiling and wall face painting, anti-static painting for the surface of plastic cases of electric appliance; laminated complex material series: anti-acid/alkali barrel or reservoir laminate, anti-electromagnetic wave interference laminated painting for wall face, floor, outer wall of roof, etc. With respect to the co-polymerization of the low electronic impedance high molecular weight polymer intermediate body with the epoxy resin, with the normal temperature two liquid-type epoxy resin floor pavement material exemplified, the description is as follows: during stirring of the epoxy resin (bisphenol A series), the low electronic impedance high molecular weight polymer intermediate body (ensure that pH is within 6~8) is added thereto so as to totally dissolve both. Then a color paste and various necessary aids specifically used for the conductive epoxy resin are added to form a complete major agent mode of the conductive floor coating. Then a cross linking bridging reaction hardener with a weight of 5–50% of the epoxy resin major agent is taken to be fully evenly stirred with the epoxy resin major agent. Thereafter, the mixture is painted on the surface of a painted article to form a coating film or poured into a mold to form a cast model body after being hardened and demolded. This is the low electronic impedance high molecular weight polymer. During the cross linking reaction, the low electronic impedance high molecular weight polymer intermediate body plays an important conducting role. The resonance of the double bonds and n electrons contained by itself as well as the inter-winding between the molecular structure of the formed product form a current path to achieve the conductive function.

The present invention can be best understood through the following detailed description:

DETAILED DESCRIPTION OF THE PREFERRED EMBODIMENTS

The description of the present invention can be divided into two major parts. That is, the low electronic impedance high molecular weight polymer intermediate body and the low electronic impedance high molecular weight polymer formed by co-polymerization cross linking reaction and hardening of the polymer intermediate body and the thermosetting engineering plastics~normal temperature two liquid-type epoxy resin. The preparation, materials used, application, working method, and the formed body test comparison table of the two parts will be described hereinbelow one by one:

(A) Low electronic impedance high molecular weight polymer intermediate body:
1. Preparation: a metallic salt is added to an inorganic acid with a weight 0.5–2.0 times the weight of the metallic salt. In a sealed stirring tank, the mixture is fully stirred to totally dissolve both to form a metallic ionic solution as shown by the common equation (I):

$$CaO+2HCl \leftrightarrows Ca^{2+}+2Cl^-+H_2O \qquad \text{Common equation (I)}$$

Calcium oxide and hydrochloric acid through the dissolution form calcium cation and chlorine anion and water, which are generally called a metallic ionic compound solution. In a slowly stirred state, a tertiary alcohol with a weight 0.5–2.0 times the weight of the metallic ionic compound solution is slowly added into the metallic ionic compound solution. After two times of dehydration and polymerization, a complex ionic polymer with double bonds and hydroxyl groups (—OH) and n electrons carrying positive-charge is formed.

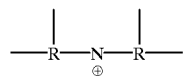

2. Material: In the content of the preparation of 1, the metallic salt mentioned is selected from the acidic salts or alkali salts soluble in inorganic acid, alcohol, glycerol, water, etc., such as calcium oxide, copper oxide, nickel oxide, silver oxide, aluminum oxide, chrome oxide, zinc oxide, ammonium chloride, barium chloride, lithium chloride, aluminum chloride, ferric chloride, silver chloride, zinc chloride, lithium carbonate, silver nitrate, lithium nitrate, lithium sulfate, barium sulfate, etc. In the content of the preparation of 1, the inorganic acid mentioned is selected from sulfuric acid, hydrochloric acid, nitric acid, hydrobromic acid, hydroiodic acid, peroxochloric acid, fluorosulfonic acid, trifluoromethylsulfonic acid, etc. The alcohol for dehydration is selected from tertiary alcohols, glycerol, etc. The alkali solution for neutralizing the acid polymer is selected from amines such as aqueous ammonia, etc.

(B) Copolymer of low electronic impedance high molecular weight polymer intermediate body and the thermosetting normal temperature two liquid-type epoxy resin:
1. Preparation: 100 parts of thermosetting normal temperature two liquid cross linking reaction-type epoxy

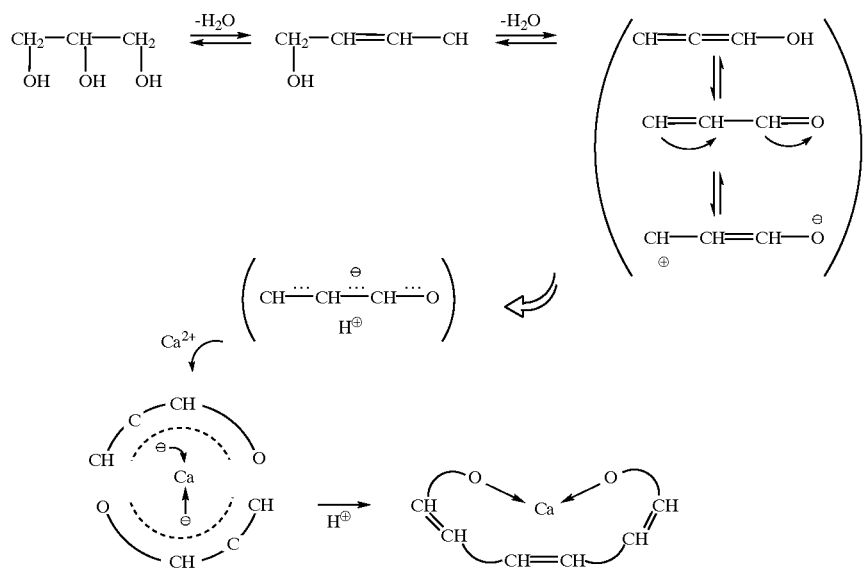

As shown in common equation (II), at this time, the newly produced complex ionic polymer is in an acidic environment as an acidic polymer and the polymer itself is still active and will further react and polymerize to plasticize. For terminating the reaction of the polymer, an amine alkali solution with a weight 0.5–2.0 times the weight of the polymer must be added to neutralize the pH (to about within 6–8) and stabilize the property of the complex ionic polymer to really form a low electronic impedance high molecular weight polymer. The polymer has bonds for bonding with the thermosetting engineering plastic high molecular weight resin as the structure of common equation (III). This is one of the characteristics of the present invention.

resin monomer containing epoxy groups are placed into a sealed container. With stirring, 5–25 parts of low electronic impedance high molecular weight polymer intermediate body are slowly added to the mixture. At normal temperature or at a temperature within 60–70° C., the mixture is fully stirred to totally dissolve both to form a low electronic impedance epoxy resin copolymer. The co-polymerization procedure is as shown by common equation (IV). Then 5–25 parts of color filling material and necessary aid are added to form a "major agent" in the low electronic impedance epoxy resin floor coating two liquids. 100 parts by weight of the low electronic impedance epoxy resin floor coating major agent and an epoxy resin reaction cross linking bridging agent with a weight 5–50% of the weight of the major agent are fully mixed and evenly stirred at normal temperature. At this time, the low electronic impedance high molecular weight polymer intermediate body, epoxy resin major agent and epoxy resin hardener (reaction cross linking bridging agent) copolymerize and react with cross linking and harden to form a low electronic impedance copolymer product. During the cross linking hardening procedure, in the low electronic impedance high molecular weight polymer intermediate body, the π electrons carrying positive charge will replace the electrons in the epoxy resin high molecular weight polymer and form a current path through the inter-winding between the structural molecules of the product. Therefore, the low electronic impedance high molecular weight epoxy resin thermosetting product has low electronic impedance and good conductivity.

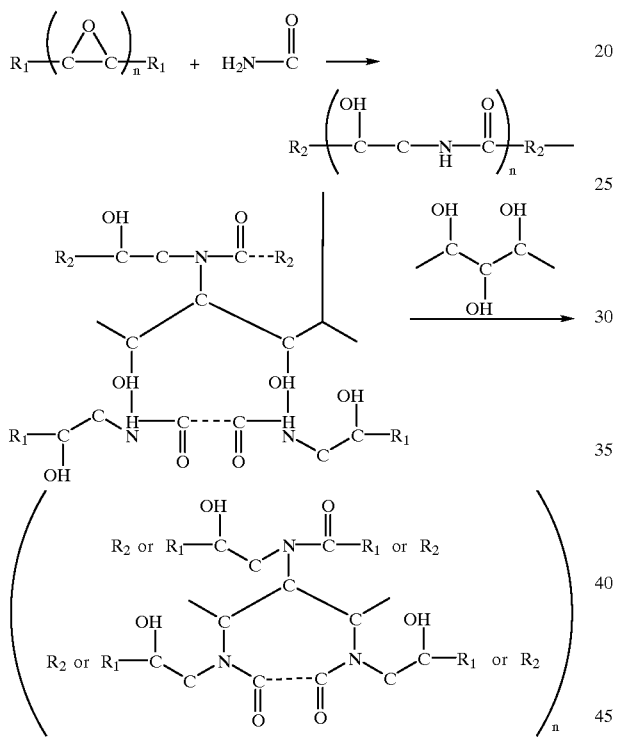

2. Material: In the content of the preparation of 1, the thermosetting resin mentioned means the two liquid-type epoxy resin high molecular weight polymer containing at least one epoxy group selected from bisphenol A series epoxy resin, phenolic series epoxy resin, polyphenol series epoxy resin: polyhydroxyl group benzene series epoxy resin, carboxyl acid epoxy resin, aromatic bicarboxyl epoxy resin, cyclohexene series epoxy resin, etc. in which bisphenol A series epoxy is mostly used. In the content of the preparation of 1, the reaction cross linking bridging agent mentioned is selected from fatty polyamines, aromatic amines, secondary and tertiary amine, polyamides, etc. In the content of the preparation of 1, the color mentioned is selected from chromate of lead yellow and zinc-chrome yellow, sulfate of barium sulfate and lead sulfate, phosphate of cobalt violet and manganese violet, sulfide of cadmium yellow, cadmium red and mercury sulfide, ferrous cyanide, carbonate of calcium carbonate and magnesium carbonate, oxide of titanium white, zinc white, Indian red and chrome oxide green, silicate of calcium silicate and ultramarine, metallic powder of aluminum powder, etc. In the content of the preparation of 1, the filling material mentioned is selected from inorganic materials such as calcium carbonate, mica powder, titanium white powder, carbon black, talc powder, feldspar powder, kaolin, barium carbonate, barium sulfate, magnesium carbonate, silicon carbide, quartz sand, quartz powder, potassium titanate, barium titanate, diatomaceous earth, glass powder, barite, baked gypsum, copper sulfate, chalk, etc. In the content of the preparation of 1, the aids mentioned include dispersing agent, moistening agent, planing agent, polishing agent, anti-violet ray agent, de-bubbling agent, anti-sediment agent, viscosity increasing agent, anti-scabbing agent, anti-color buoyancy agent, anti-color layering agent, anti-gas whitening agent, reaction diluting agent, reaction expediting agent, etc.

(C) Description of the characteristics of epoxy resin low electronic impedance high molecular weight polymer:

(1) By means of inter-winding between molecules of the high molecular weight polymer, the resonance π electrons of the molecular structure forms a current path to achieve the object of conductivity. This is not like the general conductive coating material which achieves its conductive function by means of adding a great amount of conductive filling material such as metallic microparticles or carbon powder.

(2) When the low electronic impedance high molecular weight polymer of the present invention serves as an epoxy resin conductive floor coating, the major component of the epoxy resin itself is a low electronic impedance high molecular weight polymer with excellent conductive function so that the current path of the formed coating film is not blocked by the resin and maintains a super conductive function. Therefore, during the working of the conductive floor, it is unnecessary to first pave copper meshes onto blank ground as for the conventional conductive floor and it is only necessary to reserve a connector for connecting with outdoor grounding wire. This saves labor and lowers the cost.

(3) When the low electronic impedance high molecular weight polymer of the present invention serves as an epoxy resin conductive floor coating, it still keeps the various excellent mechanical properties and good physical and chemical properties of the epoxy resin, including anti-tension, anti-compression, anti-acid/alkali, anti-medicine, anti-abrasion, dustproof, anti-impact, adhesion strength, little contractility, anti-temperature difference, bending strength, anti-oil, anti-solution, little moisture-absorption, bright color, polish, etc.

(4) When the low electronic impedance high molecular weight polymer of the present invention serves as an epoxy resin conductive floor coating, the working method is totally identical to the working method of the general epoxy resin floor coating. A worker only needs to work according to the common standard floor working method to achieve an epoxy resin floor with perfect appearance, excellent mechanical properties and conductive function. In other words, the working method of the epoxy resin conductive floor is totally not limited.

(5) When the low electronic impedance high molecular weight polymer of the present invention serves as an epoxy resin conductive floor coating, there is a feature which is not obtainable with conventional conductive floor coating, that is the intermediate coating and top coating can be thickly applied by a sleeker to achieve the same polish and brightness of a conventional epoxy resin floor. This is not like the conventional epoxy resin conductive floor which can be only painted by a roller to achieve a dim surface.

(6) When the low electronic impedance high molecular weight polymer of the present invention serves as an epoxy resin conductive floor coating it is integrally formed without adjoining seam and without flying dust. This is not like the conventional conductive coating in which a great amount of conductive filling material is added and the component of resin is insufficient. Therefore, the conventional conductive coating is subject to wearing or oxidation. Under such circumstance, the conductive filling material micro-particles will detach and become dusts which affect the cleanliness of the room.

(7) When the low electronic impedance high molecular weight polymer of the present invention serves as an epoxy resin conductive floor coating, it has very excellent conductivity. The surface volume inherent resistance thereof is within $10^8 \sim 10^{-2}$ ($\Omega \cdot cm$).

(8) When the low electronic impedance high molecular weight polymer of the present invention serves as an epoxy resin conductive laminated reinforced complex coating, the epoxy resin laminated liquid itself is a low electronic impedance high molecular weight polymer and has excellent conductive function, and after being immersed and hardened, the non-conductive fiber glass matting can be changed into a conductive fiber sheet with an excellent conductive function.

(D) Description of usage of the epoxy resin low electronic impedance high molecular weight polymer:

(1) Generally, the inherent volume resistance of the antistatic coating for floor, ceiling and wall face is within $10^8 \sim 10^6$ $\Omega/cm$. This is applicable to a hospital operating room, a laboratory, an electronic factory dustless room, a semiconductor production line, a computer main board production line, a highly transparent plastic film production line, a food packaging room, a bacteriumless room, a precision mechanical instrument factory, a printing factory, a computer controlling room, an air force simulative aircraft room, etc. where the room must be free from dust and static interference.

(2) The inherent volume resistance of the anti-explosion conductive floor is within $10^5 \sim 10^2$ $\Omega/cm$. This is applicable to a military ammunition manufacturing site and storage, a firecracker manufacturing site and storage, a chemical factory, solvent, oil, natural gas distributing site and storage, a gas production factory, a car painting room, a rice mill, a grain processing mill, a feed manufacturing factory, a barn, etc.

(3) The inherent volume resistance of the electromagnetic wave blocking laminated coating is within $10^5 \sim 10^2$ $\Omega/cm$. This is applicable to the driving protective shield of an electromagnetic wave source machine, driving/driven electromagnetic wave protective shield of high voltage tower and driving/driven electromagnetic wave protective shield of aircraft/satellite controlling center, communication machine room, robot-using production line controlling room, etc.

(E) Description of application of working method of the epoxy resin low electronic impedance high molecular weight polymer:

(1) Painting method: the anti-static function is only required to be within $10^9 \sim 10^7$ $\Omega/cm$. This is a simple working method used in a non-heavy load light step section and non-acid/alkali wet production procedure section. The used tool is a roller or a hair brush. This is a plane polished thin painting working method with a film thickness under 0.5 mm.

(2) Self-plane type sleeking painting working method: with respect to those sites more strictly requiring conductive function, the surface impedance coefficient is within $10^6 \sim 10^2$ $\Omega/cm$. This working method is applicable to these sites. The working method is characterized by the thick painting with a sleeker. The surface is conductive and brightly polished. This distinguishes the present invention from the others.

(3) Resin sand plasma working method: In the case of a warehouse factory in which a heavy forklift runs or which is subject to heavy loads, the surface impedance value is within $10^6 \sim 10^4$ $\Omega/cm$. This working method is applicable to such places. This working method is characterized in that the surface is conductive and painted thickly to resist heavy loads.

(4) Fiber glass laminated working method: This working method is applicable to those areas where acid/alkali liquid, punch shocking or blank ground serious cracking exists. The impedance value is within $10^8 \sim 10^5$ $\Omega/cm$. When serving as an electromagnetic wave protective shield, the impedance value is within $10^6 \sim 10^2$ $\Omega/cm$ and the fiber glass laminated roof/wall face coating method is applicable. The common feature is that this working method is able to change non-conductive fiber glass into fiber glass sheet with excellent conductive function.

(F) When the low electronic impedance high molecular weight polymer of the present invention serves as an epoxy resin conductive coating, it is compared with conventional epoxy resin conductive coatings:

(1) The basic conductive factor is different:
  (a) The basic conductive factor of the epoxy resin low electronic impedance high molecular weight polymer of the present invention is such that the metallic salt complex ionic compound, epoxy resin and cross linking reaction bridging agent are co-polymerized and bonded to form a low electronic impedance copolymer product. The $\pi$ electrons of the metallic salt complex ionic compound carrying a positive charge replace the electrons in the epoxy resin polymer containing epoxy group and form a current path through the inter-winding between the structural molecules of the product.
  (b) The basic conductive factor of conventional epoxy resin conductive coatings is such that a great amount of conductive filling materials such as metal micro-particles, carbon powder, metallic scales, metal short fibers, etc. are added into the non-conductive epoxy resin coating. The current is conducted through a current path formed by the contact between the metallic micro-particles. The epoxy resin itself still is a polymer without conductivity.

(2) The conductive energy is different:
  (a) The epoxy resin low electronic impedance high molecular weight polymer of the present invention itself has conductive function so that the product has great conductive energy and low electronic impedance. At room temperature of 23° C. and relative humidity of 50%, the inherent volume resistance is $10^9 \sim 10^2$ ($\Omega \cdot cm$). This reaches any level of anti-explosion.
  (b) In conventional epoxy resin conductive coatings, the epoxy resin is a non-conductive high molecular weight polymer which will block the current path during the reaction and forming procedure to greatly deteriorate the conductive energy. At room temperature of 23° C. and relative humidity of 50%, the inherent volume resistance is only $10^9 \sim 10^5$ $\Omega/cm$. This can hardly reach the level of anti-explosion.

(3) The durability of the conductive function is different:
   (a) The epoxy resin low electronic impedance high molecular weight polymer of the present invention itself is a conductive body so that the product will not sequentially block the current path due to high molecular weight polymer bridging reaction. Therefore, the conductive function is durable.
   (b) In conventional epoxy resin conductive coatings, the high molecular weight polymer itself is not conductive so that the current path of the conductive filling material micro-particles will be gradually blocked due to the bridging reaction of the polymer. Therefore, the conductive function of the formed product is not durable and will be gradually deteriorated over time.

(4) The accessories of the conductive floor are different:
   (a) The epoxy resin low electronic impedance high molecular weight polymer of the present invention itself is a conductive body so that when serving as a floor coating, all the layers of bottom coating, intermediate coating and top coating have good conductive energy so that the accessories thereof are simplified. It is only necessary to reserve a connector on a wall corner for connecting with the external grounding wire. This saves much trouble in working and reduces cost.
   (b) In conventional epoxy resin conductive coatings, the conductive filling materials are blocked by the non-conductive resin so that the conductive function is interrupted and unstable. It is necessary to additionally mount a ground mesh on the cement blank ground (conductive copper foil, copper mesh, metallic mesh or conductive tape, etc.) for connecting with external grounding wire as an enhancing conductive measure. This complicates the working and wastes materials.

(5) The limitation of the color of the coating is different:
   (a) When serving as a conductive coating, the epoxy resin low electronic impedance high molecular weight polymer of the present invention is free from any conductive filling materials (such as metallic micro-particles, carbon powder, etc.) which will affect the color brightness so that no matter what color the formed product has, the product can keep the brightness without limitation.
   (b) In conventional epoxy resin conductive coatings, a great amount of conductive filling materials are added, which will affect the color brightness so that the color of the formed product is limited to green, gray, brown or black. The options are less and the brightness of such colors is poor.

(6) The amount of added solvent is different:
   (a) When serving as a conductive coating, a normal amount (under 5%) of solvent for general epoxy resin floor painting is added to the epoxy resin low electronic impedance high molecular weight polymer of the present invention or even no solvent is added to achieve a good flowability. Therefore, not only an excellent workability is achieved, but also because the amount of the added solvent is within the allowed range, the basic chemical, physical and mechanical properties of the epoxy resin coating film can be surely kept. Moreover, the coating film is durable without cracking or detachment.
   (b) In conventional epoxy resin conductive coatings, a great amount of conductive filling materials are added so that the coating tends to sediment and is thick with poor flowability. Therefore, working is difficult. As a result, excessive amount (over 20%) of solvent such as toluene, acetone, etc. must be added for working. This leads to a problem of environmental protection. More seriously, the great amount of solvent will deteriorate various basic physical and chemical properties of the epoxy resin and speed the aging of the coating. This increases the contractility of the coating and makes the coating film readily subject to cracking and detachment.

(7) The working method is different:
   (a) When serving as a conductive painting, the epoxy resin low electronic impedance high molecular weight polymer of the present invention can be thin painted by a roller into a plane polished face by way of painting type working method. Alternatively, the present invention can be thick painted by a sleeker into a bright polished face by way of spreading type working method. Also, the resin sand plasma type working method with quartz sand added is applicable as the laminating working method for the fiber glass FRP complex reinforced material. Therefore, the conductive coating of the present invention can be universally worked.
   (b) Conventional epoxy resin conductive coatings are limited by the conductive filling materials and can be worked only with a roller by thin painting working method. In case of thick painting with a sleeker, the conductive filling material will sediment, while the non-conductive resin will buoy on the surface to block the current path and lose the conductive function. In addition, due to the affection of the conductive filling material, it is impossible to perform the laminating working method for fiber glass FRP complex reinforced material. Therefore, the working method is quite limited and it is impossible to achieve a polished bright face of a general epoxy resin floor.

(G) Comparison between the major physical properties of the conductive floor painting of the present invention and conventional conductive floor coating:

| No | test item | unit | test method | this invention | conventional |
|---|---|---|---|---|---|
| 1 | compression strength | KGF/cm$^2$ | ASTM D690 | 645 | 637 |
| 2 | anti-abrasion test | ℊ | ASTM D4060 | 0.3 | 0.8 |
| 3 | hardness (pencil) | H | J18 5400 8.4 | 2H | 2H |
| 4 | anti-impact | kGcm/cm$^2$ | J18 5400 8.3 | 2.4 | 4.7 |
| 5 | 60° mirror face polish | degree | CNS 7773 | 70 | 20 |
| 6 | volume electron impedance | Ω/cm | #M 701 TAST | $2.5 \times 10^2$ | $3.2 \times 10^6$ |

Note:
The test body should be cultivated for over 7 days and the test should be performed under the environmental conditions of room temperature 23° C. and relative humidity (RH) 50%.

What is claimed is:

1. A thermosetting epoxy resin prepared by; adding a metallic salt or oxide, which metallic salt or oxide is soluble in an inorganic acid and water or an alcohol, to an inorganic acid in a solvent selected from the group consisting of alcohol and water to produce a metallic cation;

adding an alcohol to form a complex ionic polymer double bonds and hydroxyl groups and p electrons carrying a positive charge;

adding an alkali solution to neutralize the mixture to produce a low electronic impedance high molecular weight polymer intermediate of equation II

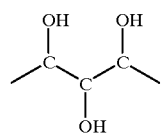

adding an epoxy resin containing epoxy groups according to equation IV

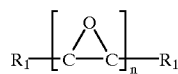

adding a cross-linking agent; and stirring the mixture to from a thermosetting epoxy resin according to equation V

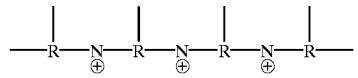

wherein the inherent volume resistance of the thermosetting epoxy resin reaches $10^{-2}$ ($\Omega$/cm).

2. The thermosetting epoxy resin according to claim 1 further containing coloring agent, fillers, and processing aids.

3. The thermosetting epoxy resin according to claim 1 wherein at a temperature of 23° C. and a relative humidity of 50% the tested inherent volume resistance of the formed product is from $10^{-8}$ ($\Omega$/cm) to $10^{-2}$ ($\Omega$/cm).

4. The thermosetting epoxy resin according to claim 1 wherein the salt or metallic oxide is selected from the group consisting of calcium oxide, copper oxide, nickel oxide, silver oxide, aluminum oxide, chromic oxide, zinc oxide, ammonium chloride, barium chloride, lithium chloride, aluminum chloride, ferric chloride, silver chloride, zinc chloride, lithium carbonate, silver nitrate, lithium nitrate, lithium sulfate, and barium sulfate.

5. The thermosetting epoxy resin according to claim 1 wherein the inorganic acid is selected from the group consisting of sulfuric acid, hydrochloric acid, nitric acid, hydrobromic acid, hydriodic acid, peroxochloric acid, fluorosulfonic acid, and trifluoromethylsulfonic acid.

6. The thermosetting epoxy resin according to claim 1 wherein the alcohol is selected from the group consisting of tertiary alcohols and glycerol.

7. A composite comprising a conductive coating formed by coating the thermosetting epoxy resin according to claim 1 onto a substrate.

8. The composite according to claim 7 wherein the thermosetting epoxy resin has been coated onto the substrate using a roller, a paint brush, a thin painting gasless injection gun, or a thick painting sleeker, wherein the coating has a thickness of up to 3 mm.

9. The composite according to claim 8 wherein the tested surface 60° mirror face polish can reach over 60°.

10. The composite according to claim 7 wherein the substrate is a fiber glass reinforced material.

* * * * *